Nov. 30, 1954  G. V. STILLE ET AL  2,695,699
DISTRIBUTING APPARATUS
Filed Jan. 22, 1949  2 Sheets-Sheet 1
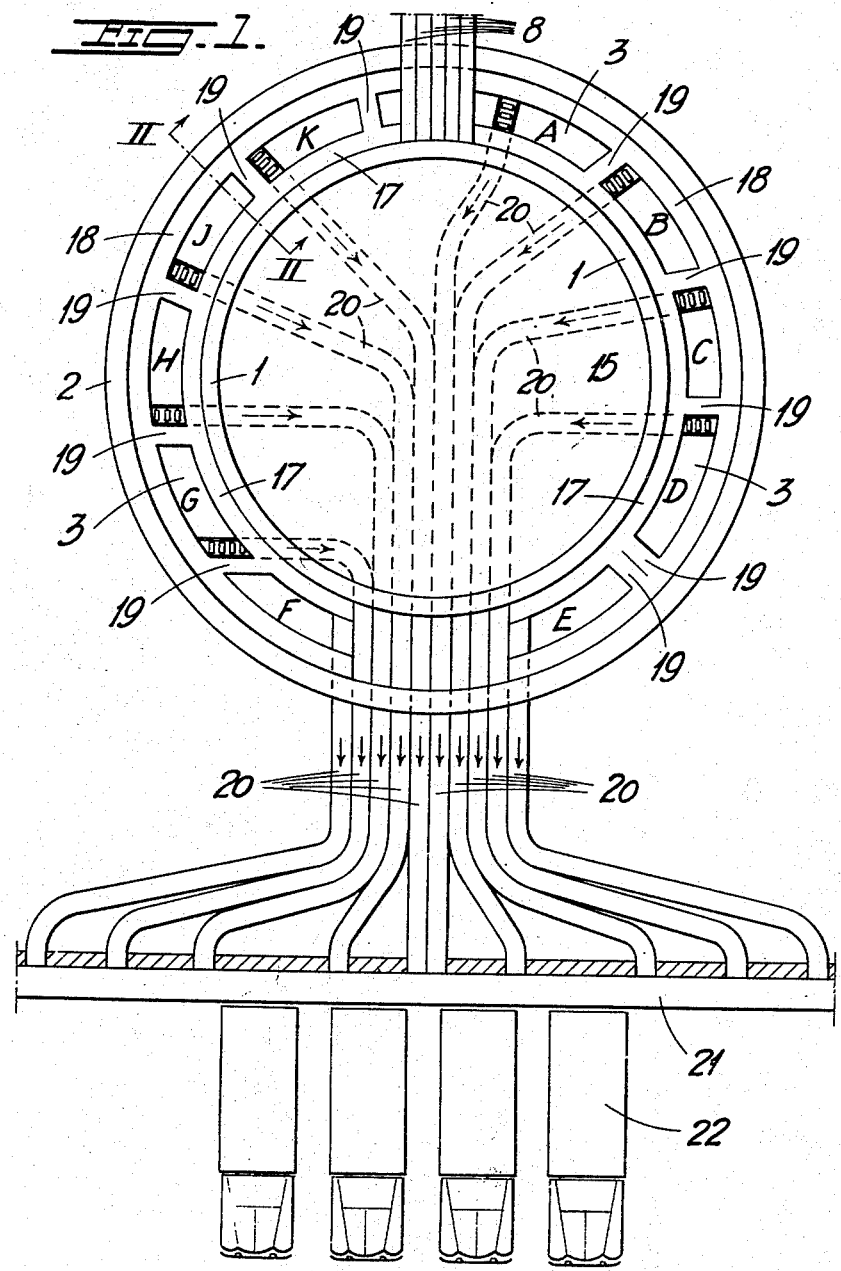
Gunnar Valdemar Stille
Nils Hugo Lindblom
By Fraser, Myers Manley
Att'ys

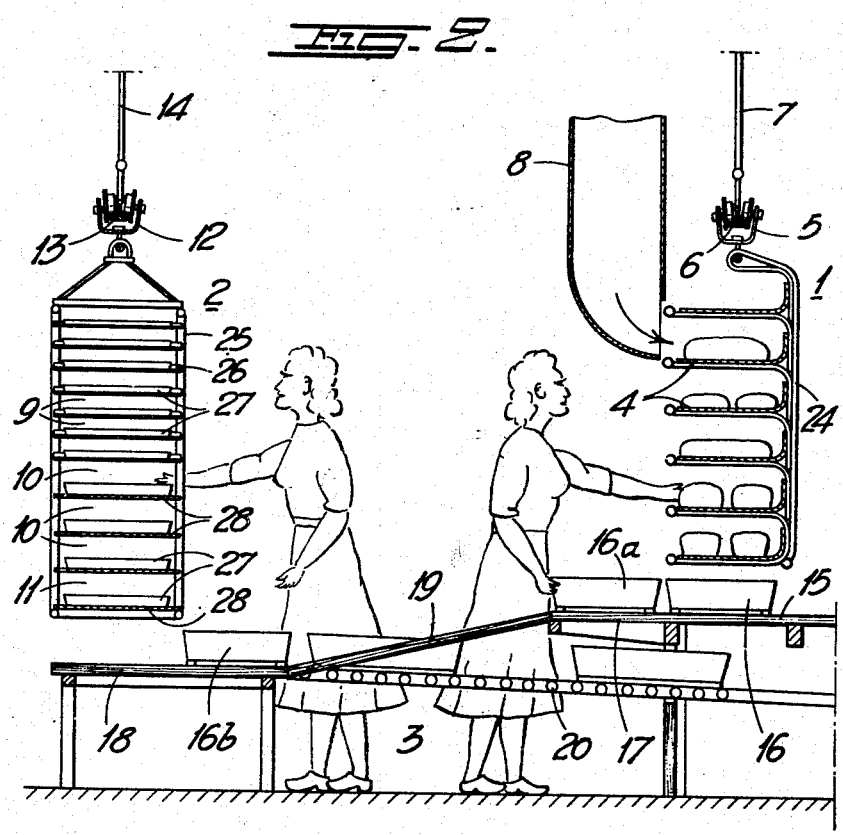

United States Patent Office 2,695,699
Patented Nov. 30, 1954

2,695,699

DISTRIBUTING APPARATUS

Gunnar Valdemar Stille, Roslags-Nasby, and Nils Hugo Lindblom, Stockholm, Sweden, assignors to Stockholms Bageriaktiebolag, Stockholm, Sweden, a company of Sweden Application January 22, 1949, Serial No. 72,154

Claims priority, application Sweden January 27, 1948

2 Claims. (Cl. 198—19)

The present invention relates to apparatus for the distribution of goods of different varieties which have to be distributed in determined differing numbers into separate containers for transport. The apparatus is particularly suited for the distribution of bakery goods which in large bakeries are often made in many different varieties and then have to be transported as quickly as possible to various shops, different numbers of the different varieties having to be sent to the shops. Hitherto the usual procedure was to place the containers in which the goods were to be transported upon trucks which were then run one after another to the positions where the various varieties of goods were taken out of the ovens, the required number of goods of the variety in question which were to be sent to the corresponding shop being counted out into each container at each place. The filled containers were then run away and loaded on to motor trucks. This system of distribution is, however, very slow and requires a large staff and is therefore expensive.

The purpose of the apparatus forming the subject of the invention is to eliminate or at least substantially to reduce these shortcomings. In the apparatus in question the distribution of the goods is effected by conveying members constructed, in a manner known per se, to move in a closed, for example, circular, path. In accordance with the invention at least two such conveying members, which advantageously consist of shelves or the like, are disposed one above the other and arranged to move as a group in a closed path at a relatively low speed, and with each such conveying member of the group a chute or the like is combined for supplying the conveying members with goods of the different varieties, so that a group of conveying members thus loaded with goods of the different varieties moves past a worker placed at the side of the path of the conveying members so that he can take from the various conveying members the desired number of goods of the different varieties and place them in transport containers placed at the side of the path of the group of conveying members, without needing to move from his place. In this way the work of distributing the various goods into the containers can be very quickly carried out so that the staff necessary can be substantially reduced. In practice the apparatus can advantageously be arranged in such a way that two groups of superposed conveying members are provided which move in similar closed paths, one of which extends outside the other, so that a gangway is formed between the two groups of conveying members, in which the workers who have to take the goods from the transport members, have their places and can take goods from both groups of conveying members. In this way the capacity of the apparatus is increased still further and it is possible to increase the variety of goods which are to be distributed into the containers.

An embodiment of the invention is illustrated by way of example in the accompanying drawings. Figure 1 shows diagrammatically in plan view a distributing apparatus in accordance with the invention, and Figure 2 shows on a larger scale a vertical section through the two groups of conveying members of the apparatus.

The illustrated apparatus which is designed for the distribution of goods of different varieties in a large bakery, has two groups 1 and 2 of conveying members which are arranged to move in circular paths, one extending outside the other, so that between the two groups of conveying members a gangway 3 is formed which is of such breadth as to accommodate the workers. The conveying members of the inner group 1 consist, in the illustrated example, of six superposed annular shelves 4 which are quite open towards the gangway 3, and which may be made, for example, of stainless steel sheet. The shelves are carried by frames 24 arranged at suitable intervals (for example two metres) from one another, and which are suspended from small carriages 5 which run on a circular T-iron rail 6 which is hung from the ceiling of the room by tie bars 7. A chute 8 is provided for each shelf 4 in order to deliver to the shelves large goods, for instance, loaves, at a point in the path of the shelves. These chutes 8 can extend, for example, from the storey above that in which the distributing apparatus is set up, in which upper storey the baking ovens can be installed so that the goods can be conveyed directly from the ovens to the shelves 4.

The outer group 2 of conveying members comprises a circular framework 25 made of tubes or angle iron and which in the case illustrated is divided into seven superposed compartments 9 for baking sheets or trays, three compartments 10 for loose goods, and at the bottom a compartment 11 for empty trays. The compartments 9 are open outwards and inwards and are provided, for example, with angle iron guides 26 on to which the trays 27 can be pushed in from the outer side, that is, from the left-hand side in Figure 2. The compartments 10 and 11 can be provided with bottoms 28 of stainless steel sheet. The structure constituting the group 2 is also suspended from a suitable number of small carriages 12 which run on a circular T-iron rail 13 which is concentric with the rail 6 and is suspended from the ceiling by tie bars 14.

The carriages 5 and 12 are driven, for example by an electric motor, not shown, so that both groups 1 and 2 of conveying members are caused to move along their circular paths with a speed of about 4 to 5 metres per minute.

A little below the lowest shelf of the inner group 1 is a continuous platform 15, which serves as a store for empty transport containers 16. This platform extends somewhat outside the outer edges of the shelves 4, and here forms a work bench 17 on which the worker who takes the goods from the shelves 4, has the container 16 standing while at work, see container 16a in Figure 2. In a similar way, a little below the lowest compartment 11 of the outer group 2 is a circular work bench 18 on which the worker who takes the goods from the compartments 9 and 10 has the containers 16 standing while at work, see the container 16b in Figure 2. In the case illustrated there are ten working places A, B, C, D, E, F, G, H, J, and K, Fig. 1, in the gangway 3 between the two groups 1 and 2 of conveyor members. At each such working place the two work benches 17 and 18 are connected together by an inclined slideway 19 on which the containers 16 can be pushed over from the inner bench 17 on to the outer 18. From each working place, with the exception of the working places E and F, leads a roller runway 20 which at first extends inwards beneath the platform 15 towards the centre of the installation, whence the runways, which over the straight portions could be replaced by conveyor bands, continue through openings in the wall of the building to a loading dock 21. The conveyor bands or runways 20 from the working places E and F run directly to the said loading dock 21. At this dock stand the motor trucks 22 into which the filled containers are to be loaded for transport to the various shops.

The various large goods coming from the ovens in the upper storey are conveyed through the chutes 8 to the respective slowly circulating shelves 4 so that after one circuit each shelf is loaded with a row of goods of a particular variety. To the compartments 9 and 10 goods on trays are supplied, which are brought by an elevator, not shown, from the ovens and are then slid into the compartments from the outside. After all the shelves and compartments have been filled in this way with all the varieties of goods to be distributed, the workers in the gangway 3 begin their work. The empty containers 16 are pushed from the platform 15 on to the work bench 17, whereupon the worker shown on the right in Figure 2 takes the required numbers of goods from the various circulating shelves 4 and packs them into the containers. The partly filled containers are then pushed over the runway 19 on to the bench 18 where the other worker fills the containers with the required numbers of goods from the trays in the compartments 9 and 10. The filled containers are then transported over the roller runways to the loading dock 21. The emptied baking trays in the compartments 9 and 10 are pushed into the compartment 11 whence they are removed at a suitable point and transported to a place where they are cleansed. This lowermost compartment 11 for the empty trays may advantageously be made in the form of a shelf that is quite open all along the outer circumference of the framework 25, so that the empty trays can be removed from it in an outward direction by said trays moving against a stationary guide bar or the like which extends into said compartment and deflects the trays therefrom while the framework 25 continues its movement. It will be seen that the workers can take goods of the various kinds from the different conveying members and pack them in the containers without needing to move from their places, and in this way the work of distribution can be carried out conveniently and rapidly.

The embodiment above described and illustrated in the drawings is to be considered solely as an example and can naturally be altered in various ways as regards its details without departing from the scope of the invention.

We claim:

1. A distributing apparatus of the character described, comprising in combination two groups of conveying members, each group comprising a plurality of conveying members disposed one above the other, said groups of conveying members being movable in similar closed paths at a distance from one another, one of said paths extending outside the other, a number of stationary chutes equal to the number of conveying members of one of said groups and adapted for supplying the conveying members of said group with goods of different varieties, means for supplying to the conveying members of the other group goods of different varieties, a stationary work bench below each of said groups of conveying members, and a gangway for workers between said work benches, whereby a worker having his place in said gangway can take from the various conveying members of both groups the desired number of goods of different varieties and place them in a transport container placed on one of said work benches.

2. An apparatus as defined in claim 1, in which the conveying members of one group consist of annular shelves which are open towards the gangway between the two groups of conveying members, and the conveying members of the other group consist of compartments for the reception of baking trays.

References Cited in the file of this patent

UNITED STATES PATENTS

| Number | Name | Date |
|---|---|---|
| 847,230 | Brockt | Mar. 12, 1907 |
| 1,288,375 | Bickley | Dec. 17, 1918 |
| 1,475,149 | Smith | Nov. 20, 1923 |
| 1,558,014 | Jaenicke | Oct. 20, 1925 |
| 1,710,779 | Mabee | Apr. 30, 1929 |
| 2,138,285 | Spiegl | Nov. 29, 1938 |